US009813748B2

(12) United States Patent
Abuelsaad et al.

(10) Patent No.: US 9,813,748 B2
(45) Date of Patent: *Nov. 7, 2017

(54) COORDINATION OF VIDEO AND/OR AUDIO RECORDING

(71) Applicant: International Business Machines Corporation, Armonk, NY (US)

(72) Inventors: Kelly Abuelsaad, Somers, NY (US); Gregory J. Boss, Saginaw, MI (US); Soobaek Jang, Hamden, CT (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,475

(22) Filed: Jan. 13, 2016

(65) Prior Publication Data

US 2016/0127761 A1 May 5, 2016

Related U.S. Application Data

(63) Continuation of application No. 14/324,664, filed on Jul. 7, 2014.

(51) Int. Cl.
*H04N 5/76* (2006.01)
*H04N 21/2743* (2011.01)
*H04N 21/214* (2011.01)
*H04N 21/8547* (2011.01)
*H04N 21/218* (2011.01)
*H04N 21/433* (2011.01)
*H04N 21/6332* (2011.01)

(52) U.S. Cl.
CPC ....... *H04N 21/2743* (2013.01); *H04N 21/214* (2013.01); *H04N 21/2181* (2013.01); *H04N 21/21805* (2013.01); *H04N 21/4334* (2013.01); *H04N 21/6332* (2013.01); *H04N 21/8547* (2013.01)

(58) Field of Classification Search
CPC .......... H04N 21/2743; H04N 21/4334; H04N 21/6332; H04N 21/8547
USPC ....... 386/296, 291, 292, 298, 299, 324, 326, 386/223, 224, 210
See application file for complete search history.

(56) References Cited

U.S. PATENT DOCUMENTS

2006/0143090 A1 6/2006 Ridings et al.
2009/0189981 A1 7/2009 Slann et al.
(Continued)

OTHER PUBLICATIONS

Rose, "CrowdFlik enables ad-hoc video collaboration at events", http://www.tuaw.com/2013/06/27/crowdflik-enables-ad-hoc-video-collaboration-at-events/, Jun. 27, 2013, 3 pages.
(Continued)

*Primary Examiner* — Robert Chevalier
(74) *Attorney, Agent, or Firm* — William H. Hartwell; Hunter E. Webb; Keohane & D'Alessandro PLLC (57) ABSTRACT

Approaches described herein provide coordination of audio and/or video recording to minimize any gaps in coverage. In one approach, users of a distributed set of recording devices are invited to join a community with other similar users via a networked application in a loosely collaborative way. The recording coordination application substantially continuously monitors the state of the recording activities and coordinates the community of users to reduce any gaps in coverage.

19 Claims, 3 Drawing Sheets

(56) References Cited

U.S. PATENT DOCUMENTS

| | | |
|---|---|---|
| 2012/0320013 A1 | 12/2012 | Perez et al. |
| 2013/0038618 A1 | 2/2013 | Urbach |
| 2013/0090133 A1* | 4/2013 | D'Jesus Bencci .... H04W 4/028 |
| | | 455/456.2 |
| 2013/0176438 A1 | 7/2013 | Mate et al. |
| 2013/0195422 A1 | 8/2013 | Patil et al. |

OTHER PUBLICATIONS

Chevalier, U.S. Appl. No. 14/324,664, Notice of Allowance dated Dec. 1, 2015, 11 pages.

* cited by examiner

FIG. 3

COORDINATION OF VIDEO AND/OR AUDIO RECORDING

The present patent document is a continuation of U.S. patent application Ser. No. 14/324,664, filed Jul. 7, 2014, entitled "COORDINATION OF VIDEO AND/OR AUDIO RECORDING", the disclosure of which is incorporated herein by reference.

TECHNICAL FIELD

This invention relates generally to video and/or audio recording of events and, more specifically, minimizing any gaps in coverage of such recordings.

BACKGROUND

The proliferation of mobile devices (phones, tablets, etc.) has created a huge increase in video and audio recordings. Billions of hours of video are watched each month on the Internet and over 100 hours of video are uploaded to the Internet every minute.

Often times it is difficult to get a complete recording of an event without any coverage gaps. This can result from a variety of circumstances such as, for example, poor vantage point, dead battery, poor lighting, and obstructions.

SUMMARY

In general, embodiments described herein provide a method, system and computer readable program for reducing gaps in coverage of audio and/or video recording by mobile devices. In one aspect, an event to be recorded is initiated with a centralized recording coordination server. A plurality of mobile recording devices is registered with the centralized recording coordination server. As recording takes place, data is transmitted to the centralized recording server. The centralized recording coordination server substantially continuously analyzes the recorded data to identify any gaps in coverage of the event. Upon identifying any potential or actual gaps, the centralized coordination server then requests mobile recording devices to initiate or continue recording to reduce any potential gaps in recording.

In an alternate aspect, a system for reducing gaps in recording coverage includes a centralized recording coordination server. A plurality of mobile recording devices is in network connection with the centralized recording coordination server such that data is transmitted by the mobile recording devices for recording on the centralized recording server. The centralized recording coordination server analyzes the recorded data to identify any gaps in coverage of an event, and when identified, requests one or more mobile recording devices to initiate or continue recording to reduce any potential gaps in recording.

In still another aspect, a computer program product contains programmed instructions for reducing gaps in recording coverage. The program instructions, which are stored on a computer readable storage medium, initiate an event to be recorded with a centralized recording coordination server. After a plurality of mobile recording devices is registered with the centralized recording coordination server, programmed instructions analyze the data transmitted by the plurality of mobile recording devices and identifies any gap in coverage of the event. When any gaps are identified, the programmed instructions cause one or more mobile recording devices to initiate or continue recording to reduce the gap in coverage of the event.

In still another aspect of the present invention provides a method for deploying a system for reducing gaps in coverage of audio and/or video recording by mobile devices comprising, providing a computer infrastructure being operable to: initiate an event to be recorded with a centralized recording coordination server; registering a plurality of mobile recording devices with the centralized recording coordination server; receiving data transmitted to the centralized recording server and substantially continuously analyzing the recorded data to identify any gaps in coverage of the event; and upon identifying any potential or actual gaps, requesting one or more mobile recording devices to initiate or continue recording to reduce any potential gaps in recording.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Several embodiments now will be described more fully herein with reference to the accompanying drawings. It will be appreciated that this disclosure may be embodied in many different forms and should not be construed as limited to the embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining," "evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

Figure 1:
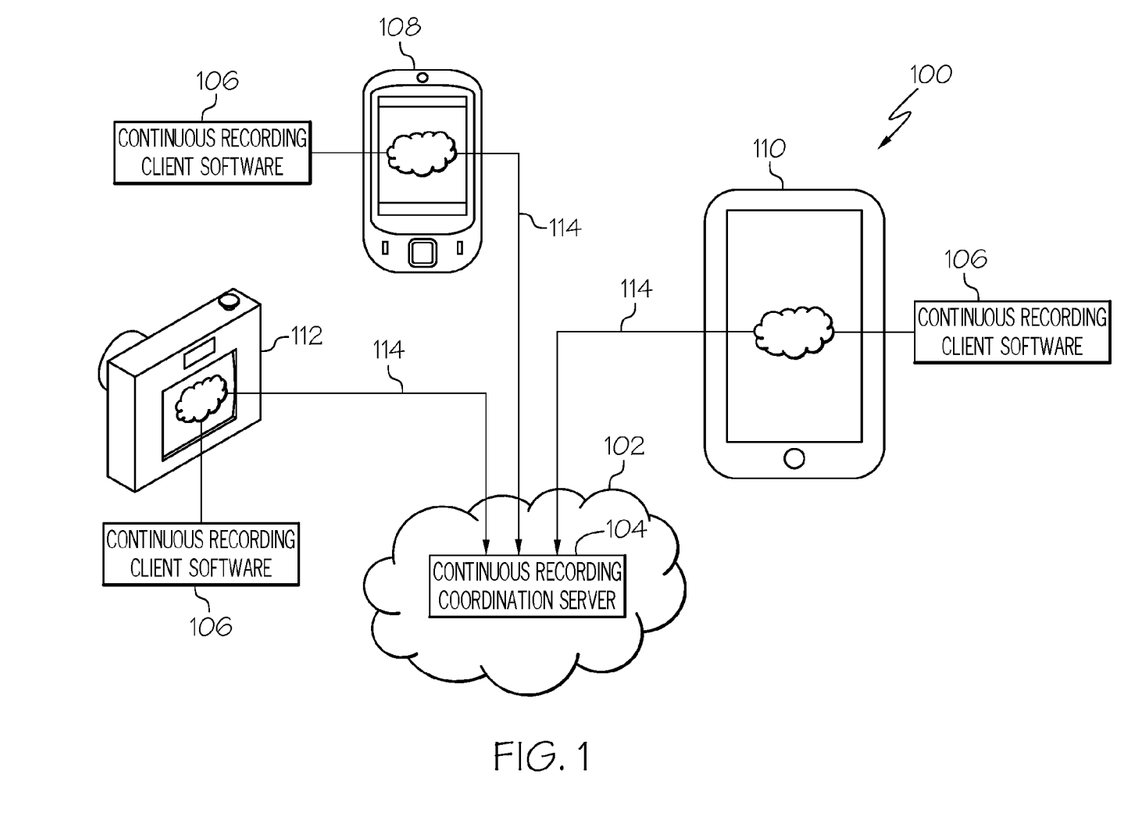
FIG. 1 shows a pictorial representation of an environment in which the invention may be implemented according to illustrative embodiments.

Referring now to FIG. 1, a computerized implementation 100 of an embodiment will be shown and described. As depicted, implementation 100 includes continuous recording continuation server 104 deployed within a computer system 102 running in a networked environment. This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 102 is intended to demonstrate that some or all of the components of implementation 100 could be deployed, managed, serviced, etc., by a service provider who offers to implement, deploy, and/or perform the functions of the present invention for others.

The continuous recording coordination system and method of an embodiment of the invention consists of server application 104 running within a general purpose computer system 102 and in communication with a client application 106 running on mobile devices. In this particular example, continuous recording coordination server 104 represents an illustrative system for providing coordination of video recording. It should be understood that many different types of general purpose computers may have different components/software running on them, but will be able perform similar functions.

In accordance with one embodiment of the invention, continuous recording coordination client software 106 runs on any device that includes video and/or audio recording capability. Such devices may include, but are not limited to, mobile phone 108, tablet computing device 110 and digital camera 112. Other recording devices, whether now known or developed in the future, may also be used.

Mobile devices 108, 110 and 112 have the ability to communicate with the continuous recording coordination server, and optionally with each other, via any means now known or that may be known in the future. This networking of devices via communication network 114 include, but are not limited to, wireless networking, Bluetooth, cellular communication (2G, 3G, LTE, etc.). All that is required is for the devices 108, 110, 112 to be networked such that they have secure connection to transfer data.

Each of the devices 108, 110, 112 is registered as a trusted party either with each other and/or with the continuous recording coordination server 104. Such trust relationships can be established via any known techniques including, but not limited to, connection to same secure wireless connection, use of a shared token, registration via an application running in all devices, etc.

Figure 2:
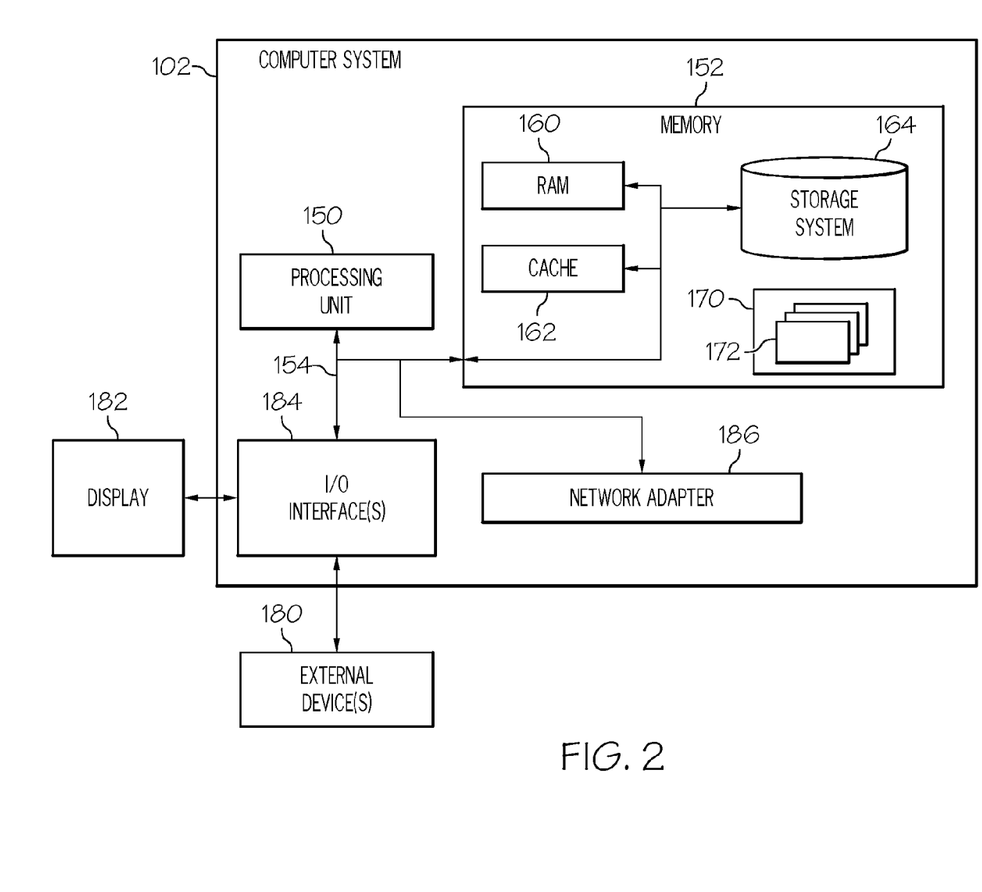
FIG. 2 shows a pictorial representation of an environment in which the invention may be implemented according to illustrative embodiments.

Referring to FIG. 2, general purpose computer system 102 is depicted. It is typically operational with numerous other general purpose or special purpose computing system environments or configurations. Examples of well-known computing systems, environments, and/or configurations that may be suitable for use with computer system 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

The components of computer system 102 may include, but are not limited to, one or more processors or processing units 150, a system memory 152, and a bus 154 that couples various system components including system memory 152 to processor 150.

Bus 152 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 102 typically includes a variety of computer system readable media. Such media may be any available media that is accessible by computer system 102, and it includes both volatile and non-volatile media, removable and non-removable media.

System memory 152 can include computer system readable media in the form of volatile memory, such as random access memory (RAM) 160 and/or cache memory 162. Computer system 102 may further include other removable/non-removable, volatile/non-volatile computer system storage media. By way of example only, storage system 164 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 154 by one or more data media interfaces. As will be further depicted and described blow, memory 152 may include at least one program product having a set (e.g., at least one) of program modules that are configured to carry out the functions of embodiments of the invention.

Program/utility 170, having a set (at least one) of program modules 172, may be stored in memory 152 by way of example, and not limitation, as well as an operating system, one or more application programs, other program modules, and program data. Each of the operating system, one or more application programs, other program modules, and program data or some combination thereof, may include an implementation of a networking environment. Program modules 172 generally carry out the functions and/or methodologies of embodiments of the invention as described herein.

Computer system 102 may also communicate with one or more external devices 180 such as a keyboard, a pointing device, a display 182, etc.; one or more devices that enable a user to interact with computer system 102; and/or any devices (e.g., network card, modem, etc.) that enable computer system 102 to communicate with one or more other computing devices. Such communication can occur via Input/Output (I/O) interfaces 184. Still yet, computer system 102 can communicate with one or more networks such as a local area network (LAN), a general wide area network (WAN), cellular telephone networks and/or a public network (e.g., the Internet) via network adapter 186. As depicted, network adapter 186 communicates with the other components of computer system via bus 154. It should be understood that although not shown, other hardware and/or software components could be used in conjunction with computer system 102. Examples include, but are not limited to: microcode, device drivers, redundant processing units, external disk drive arrays, RAID systems, tape drives, and data archival storage systems, etc.

In general, general purpose computer system 102 executes computer program code, such as program code for continuous recording coordination server 104, which is stored in memory 152 associated with computer system 102.

The general purpose computer system 102 may be described in the general context of computer-executable instructions, such as program modules, being executed by a computer. Generally, program modules include routines, programs, people, components, logic, data structures, and so on, which perform particular tasks or implement particular abstract data types. Computer system 102 may be practiced in distributed computing environments where tasks are performed by remote processing devices that are linked through a communications network. In a distributed computing environment, program modules may be located in both local and remote computer storage media including memory storage devices.

Figure 3:
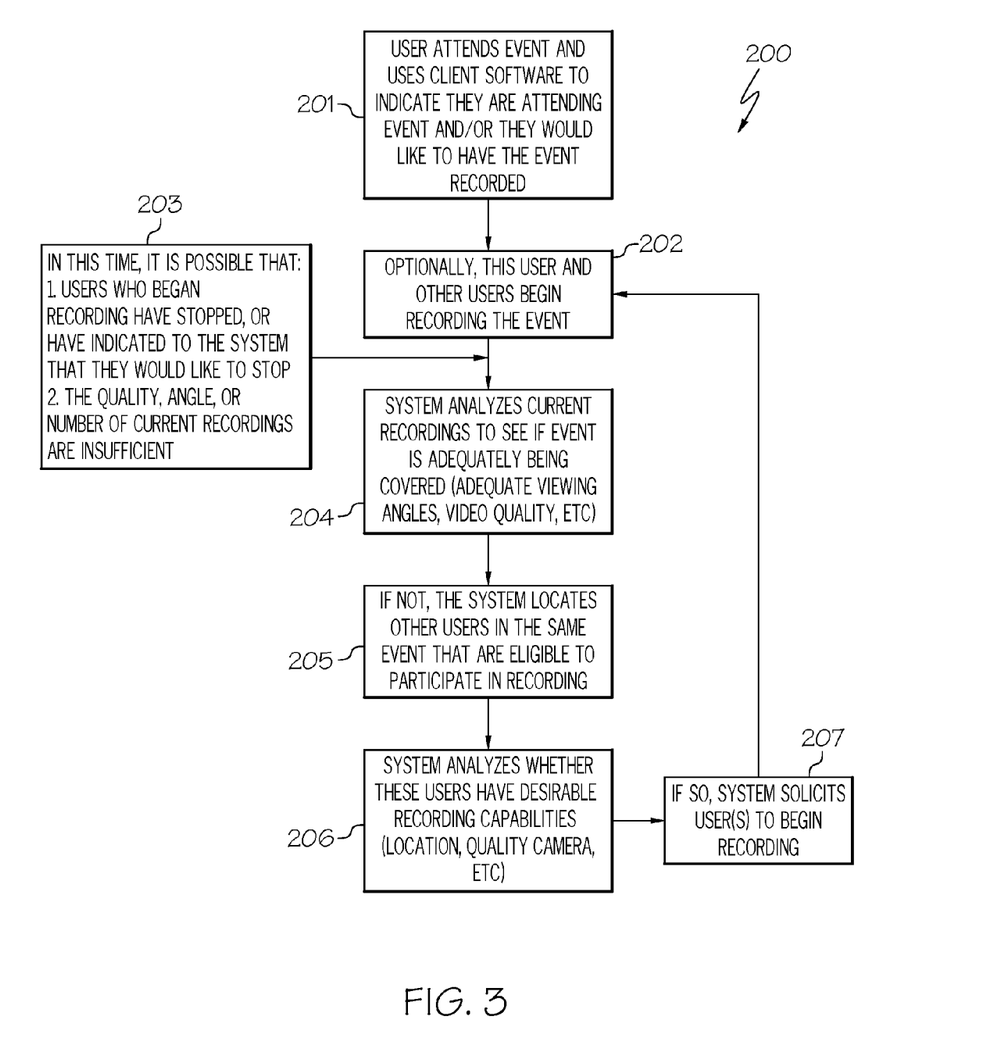
FIG. 3 shows a process flow of an implementation of providing coordination of video recording according to illustrative embodiments.

As depicted in FIG. 1, the continuous recording coordination system operates through the interaction of the client software 106 and the software of continuous recording coordination server 104, which together carry out the methodologies disclosed herein. Shown in FIG. 3 is a process flow 200 for providing the recording coordination in accordance with an embodiment of the invention.

As depicted in block 201, a user attends an event and initiates the continuous recording client application on his recording device. The client application establishes communication over a network (as described above) with the continuous recording coordination server. A list of events or communities that have already been created is displayed on the recording device. If this particular event has not been created, then the continuous recording coordination server permits the user to create one. If this particular event has already been created, then the user can indicate that it desires to join the particular event/community.

As depicted in block 202, the user, and any other users who have joined this particular community, starts recording the event. After the event starts, a number of external things can occur that may affect continuous coverage of the event. Such possible external events represented by block 203 include, but are not limited to:

1. One or more users who started recording the event stop recording for one reason or another, or indicate to the continuous recording system their intent to stop recording.
2. The quality of the recording by one or more of the recording devices is degraded.
3. The view from one or more of the recording devices has been obstructed.
4. The number and angles of current recording devices are insufficient to avoid any gaps in coverage As depicted in block 204, the algorithms of the continuous recording coordination system substantially continuously analyze the data that it receives from all of the recording devices. Each device also shares its metadata which can be used by the coordination algorithms to select the best device when switching the primary recorder; such metadata can include, without limitation:

1. Device name; brand, model, etc
2. Device resolution specification; such as 10 MP, 15 MP, etc
3. Recording time remaining
4. Sound quality (hardware and also could be audio being recorded—as it can be far away from speaker of event)

The continuous recording coordination system can also update the rank of the quality of the recording based on real time characteristics. Such factors include:

1. Shakiness (or unsteadiness) of the video (i.e. One person is using a handheld with shaky hands vs. someone else using a smooth tripod)
2. Sharpness of focus (no one wants a blurry image)
3. Sound volume/quality
4. Level of background noise
5. Lighting level (i.e. well balanced lighting where everyone is visible vs. a too dark or too bright image.
6. Resolution of video image
7. Quality of lens If the outcome of the analysis of the algorithms in block 203 results in a determination that it would be desirable to locate additional users to record the event for one reason or another, the system then locates additional users who are part of the community (block 205) and meet the threshold requirements to participate in the recording to minimize the possibility of gaps in the coverage (block 206). These threshold requirements include, but are not limited to, remaining battery life, device location, device resolution, memory, sound volume, lighting level etc. for which metadata are sent from device to the server application.

Referring to block 207, when the server application identifies additional user(s) who meet the requirements to participate in the community recording, it sends a message to such additional user(s) inquiring whether they are willing to start recording. When the system receives an affirmative response, it can either stop looking for additional users, or continue to seek out additional users to improve the coverage. In either occurrence, the additional user(s) begin to record the event (block 202) and the system loops back to block 204 and continues to monitor and analyze the current recordings until the event is completed. If there are no additional users available, the server application will so inform the user that is currently recording so that it can continue recording, if possible.

As an example of one alternative embodiment of the invention, consider the following non-limiting situation, in which two parents are attending their child's 5th grade music concert. They arrive and sit down in two seats in the front row, open their smartphones and launch an application (or "app" for short) made in accordance with one embodiment of the present invention called the "Community Video Group". This app was previously downloaded and stored on the smartphones and is now in communication over a network with a companion recording communication application that is running on a network server. Once the app is launched, the two parents then join a virtual community created by another parent 10 minutes earlier, called the "Hemmeter Elementary 5th Grade Music Concert" community. The virtual community is scheduled to last for the length of the concert, which is 90 minutes.

Two other parents who are scattered about the gymnasium also join the virtual community. All the parents begin recording the concert. Five minutes before the concert is scheduled to end, it is detected that three of the four parents have stopped recording the concert and the remaining one is about to run out of power. In order to head off any possible gap in video coverage of the concert, the system of the invention determines it should have another video recorder ready to go. The system then finds a member still connected to the virtual community with the most capable smartphone and sufficient battery life. This happens to be a parent named "Amber".

Amber receives a message window on her smartphone asking her if she would be willing to record the remaining 5 minutes of the concert. She indicates affirmatively and the system sends Amber's device a 10 second countdown to start recording. It also syncs this countdown message with the other parents who have stopped recording. In this manner, the system continues to find the most capable devices and ensures that at least one device is always recording.

Additionally, after Amber begins recording, the system is substantially continuously checking to see if any of the recordings have undesirable qualities such as: 1) an obstruction of someone's head right in front of the camera, 2) poor lighting from the area she is sitting, and/or 3) she keeps focusing in on her own child instead of panning out to view the entire group. The system can then solicit additional people to begin recording in an attempt to attain a good quality recording that can be reused by others.

In other embodiments of the invention, a mobile device can be informed where other devices in the community are located, and it may optionally display a map of where each device is located in relation to the device displaying the map. Additionally, indication of the angle of video recording for active recording devices may be reflected in the display. A device can have multiple displays shown in a screen (or in a series of screen) to view them; such as 1 view on a screen, 2 views, 4 views, etc. The content of each display may be a recent static image captured from the recording to give the user perspective of what is covered by the current recording team (frequency of captures would be controlled by the source device configuration and likely tuned to device capacity/capability).

In another embodiment, the invention provides a method that performs the process of the invention on a subscription, advertising, and/or fee basis. That is, a service provider, such as a Solution Integrator, could offer to provide recording coordination functionality to minimize gaps in recording coverage. In this case, the service provider can create, maintain, support, etc., a computer infrastructure, such as computer system 102 (FIG. 2) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for coordinating the recording of events. In this case, a computer infrastructure, such as computer system 102 (FIG. 2), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 102 (FIG. 2) or mobile devices (e.g. 108, 110, 112 in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Process flow of FIG. 3 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, a system or unit may be the combination of a processor that operates on a set of operational data.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for providing a continuous recording coordination system and method. While the invention has been particularly shown and described in conjunction with several embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for reducing gaps in recording coverage of an event, comprising:
    registering a plurality of mobile recording devices associated with an event to be recorded at the centralized recording coordination server;
    retrieving data being recorded by said plurality of mobile recording devices by said centralized recording coordination server, said centralized recording coordination server analyzing said recorded data to identify any gaps in coverage of the event; and
    said centralized recording coordination server requesting mobile recording devices to initiate or continue recording to reduce any potential gaps in coverage of the event.

2. The method of claim 1, further comprising transmitting data to at least one mobile device of said plurality of mobile recording devices about the status of the event recording.

3. The method of claim 2, wherein said data transmitted to the mobile recording device includes data about the number of other mobile recording devices available to record said event.

4. The method of claim 1, wherein the analysis performed by said centralized recording coordination server includes analysis based on any one or more of the following attributes: video resolution, lens quality, white balance, steadiness, audio quality, viewing angle, obstructions, and remaining battery life.

5. The method of claim 1, wherein each of said plurality of mobile recording devices is able to communicate directly with each of the other registered plurality of mobile recording devices.

6. The method of claim 1, further comprising retrieving all of the recorded information from the plurality of mobile recording devices by the centralized recording coordination server for later playback.

7. The method of claim 1, wherein the communication between the mobile devices and the centralized recording coordination server is via a cellular network.

8. The method of claim 1, wherein a mobile recording device also serves as the centralized recording coordination server.

9. The method of claim 1, wherein the recorded information is provided with a time stamp.

10. A system for reducing gaps in recording coverage, comprising:
    a centralized recording coordination server;
    a plurality of mobile recording devices in network connection with said centralized recording coordination server;
    a network for transmitting data being recorded by said mobile recording devices to said centralized recording server; and
    a server application executing within said centralized recording coordination server that analyzes said recorded data to identify any gaps in coverage of an event and requests one or more mobile recording devices to initiate or continue recording to reduce any potential gaps in recording.

11. The system of claim 10, the network further transmitting data, to at least one mobile recording device of the plurality of mobile recording devices, information about a status of the event recording.

12. The system of claim 11, wherein said data transmitted to the at least one mobile recording device includes data about a number of other mobile recording devices available to record said event.

13. The system of claim 10, wherein the analysis performed by said centralized recording coordination server includes analysis based on any one or more of the following attributes: video resolution, lens quality, white balance, shakiness, audio quality, viewing angle, obstructions, and remaining battery life.

14. The system of claim 10, wherein each of said mobile recording devices is able to communicate directly with each of the other registered mobile recording devices.

15. The system of claim 10, further comprising computer storage retrieving the recorded information from the mobile recording devices by the centralized recording coordination server for later playback.

16. The system of claim 10, wherein the recorded information is provided with a time stamp.

17. The system of claim 10, wherein the communication between the mobile devices and the centralized recording coordination server is via a cellular network.

18. The system of claim 10, wherein a mobile recording device also serves as the centralized recording coordination server.

19. A computer program product for reducing gaps in recording coverage, the computer program product comprising a computer readable storage medium that is not a signal, and program instructions stored on the computer readable storage medium, to:

register a plurality of mobile recording devices associated with an event to be recorded at the centralized recording coordination server;

retrieve data being recorded by said plurality of mobile recording devices by said centralized recording server;

analyze, by said centralized recording coordination server, said recorded data to identify a gap in coverage of the event; and request, by said centralized coordination server, one or more mobile recording devices to initiate or continue recording to reduce the gap in coverage of the event.

* * * * *